(12) United States Patent
Holman et al.

(10) Patent No.: US 6,435,455 B1
(45) Date of Patent: *Aug. 20, 2002

(54) FLOW-EFFICIENT, STATIC PRESSURE-SHIELDING, FIRE-RESISTANT DECOMPRESSION PANEL ASSEMBLY

(75) Inventors: Wrenn P. Holman, Federal Way; Robert W. Dost, Kent; Ernest E. Williams, Jr., Kenmore; John A. Wilson, Seattle; Raymond H. Horstman, Snohomish, all of WA (US)

(73) Assignee: The Boeing Company, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/658,837

(22) Filed: Sep. 8, 2000

Related U.S. Application Data

(63) Continuation-in-part of application No. 09/511,221, filed on Feb. 23, 2000, now abandoned, which is a continuation of application No. 08/910,576, filed on Aug. 1, 1997, now Pat. No. 6,029,933.

(51) Int. Cl.[7] .............................................. B64D 25/00
(52) U.S. Cl. ................................ 244/118.5; 244/129.2; 244/129.4; 52/1; 52/98
(58) Field of Search .......................... 244/118.5, 129.2, 244/129.4; 52/1, 98

(56) References Cited

U.S. PATENT DOCUMENTS 6,029,933 A * 2/2000 Holman et al. .......... 244/118.5

* cited by examiner

Primary Examiner—J. Woodrow Eldred
(74) Attorney, Agent, or Firm—The Boeing Company

(57) ABSTRACT

A decompression panel assembly (12) for use in an aircraft separation structure (14). The panel assembly includes a support pan (26) having an opening (28), a bull nose (64) extending outwardly from the support pan at the opening's edge, and a recess (62) surrounding the bull nose. An inner seal (70) is sized and located within the recess (62). A retaining ring (22) is provided and includes a number of fingers (84) formed from spaced-apart slits (86) extending into the retaining ring (22) from the ring's inner edge. The assembly (12) further includes a pressure relief panel (24) shaped similar to the support pan opening shape, though sized slightly larger. The pressure relief panel (24) is held between the support pan bull nose (64) and the retaining ring (22) during non-decompression use. A number of index pins (94) interconnect between the retaining ring and the support pan. A grill (30) is attached to the support pan to protect the pressure relief panel. During a rapid decompression event, the retaining ring fingers (84) flex slightly to reduce the holding force applied to the pressure relief panel (24), thus allowing the pressure relief panel to quickly and entirely detach from the panel assembly (12).

10 Claims, 11 Drawing Sheets

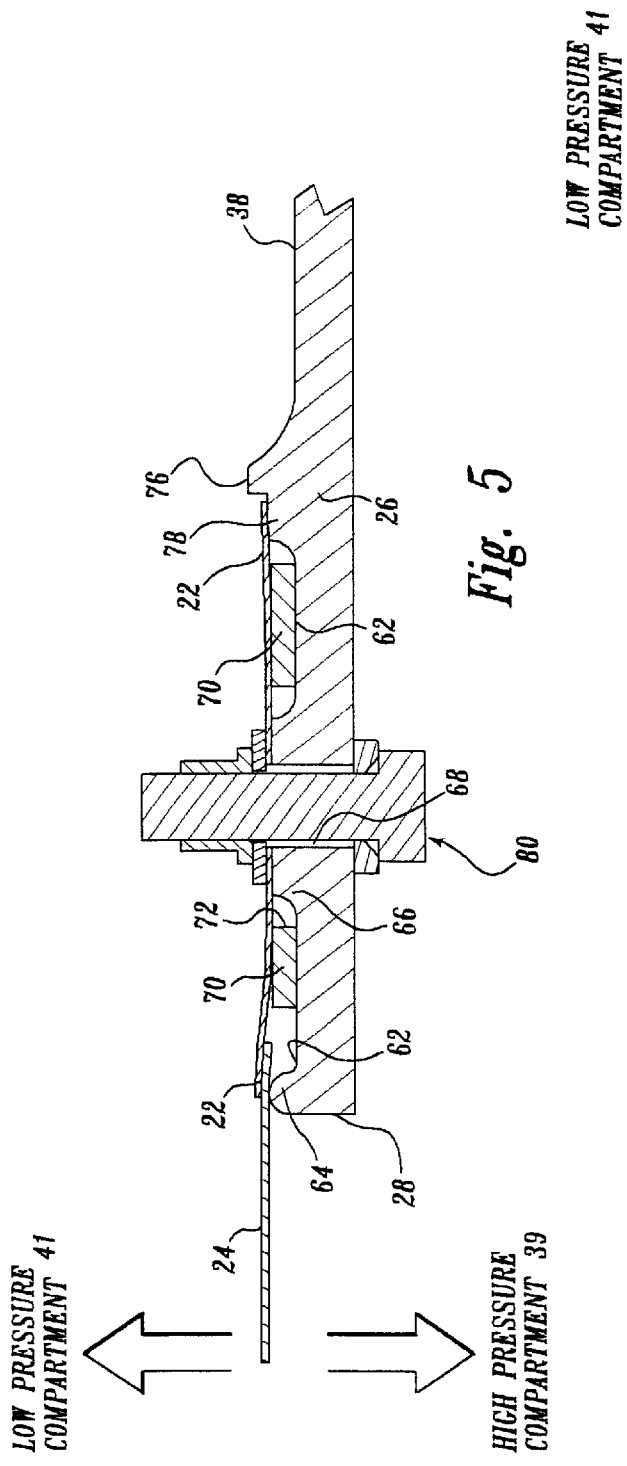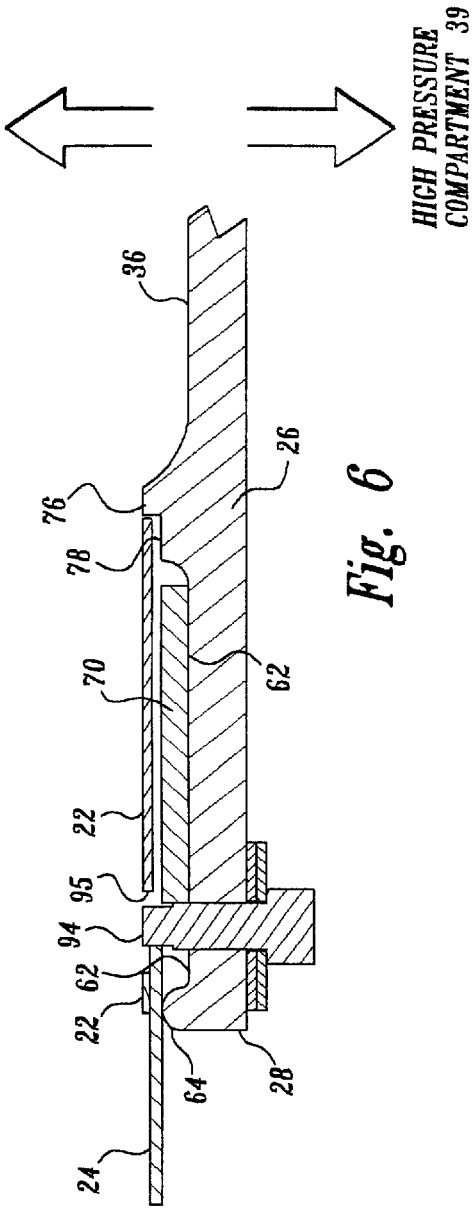

FLOW-EFFICIENT, STATIC PRESSURE-SHIELDING, FIRE-RESISTANT DECOMPRESSION PANEL ASSEMBLY

CROSS-REFERENCE TO RELATED APPLICATION

This application is a continuation-in-part of U.S. application Ser. No. 09/511,221, filed Feb. 23, 2000, ABN, which is a continuation application of Ser. No. 08/910,576, filed Aug. 1, 1997, now U.S. Pat. No. 6,029,933, which are hereby incorporated by reference in their entirety.

FIELD OF THE INVENTION

The present invention relates to decompression panels for use in a separation structure, such as a bulkhead or wall, and more particularly, to decompression panels having a pressure relief panel that releases entirely from the device during rapid decompression of a pressurized compartment.

BACKGROUND OF THE INVENTION

An aircraft is typically subdivided into two or more compartments separated by structures, e.g., walls, bulkheads, floors, etc. During flight, these compartments are positively pressurized relative to the atmospheric pressure outside the aircraft. If an opening is created between one compartment and the exterior atmosphere, the pressure difference causes a sudden exodus of interior aircraft air. As air is rushing out the opening, an almost immediate propagation of the pressure difference causes the other compartments to also attempt to decompress.

To accommodate this chain reaction of pressure differences, it is often necessary to provide decompression panels between compartments to quickly equalize the pressure differential. A difference in pressure between compartments that is not relieved rapidly could lead to deformation of a separation structure and/or surrounding components. Known decompression panels have a sandwich type construction in which a pressure relief panel is released to fully reveal an opening through the separation structure. This allows air to quickly pass therethrough and quickly relieve the pressure difference. These types of decompression panels are sometimes referred to as full release blowout panels.

There are other aircraft requirements, however, that must be considered along with the requirement to allow air to pass between compartments during decompression. In particular, some aircraft compartments rely on oxygen suffocation to extinguish fires. This requires the separation structures to act as oxygen-tight fire barriers that do not allow fire or oxygen to pass through them. In such cases, it would be advantageous to use a pressure relief panel that could quickly allow pressure equalization between compartments during a rapid decompression event, but would otherwise resist the spread of fire between compartments. This present invention is directed to providing such a panel.

SUMMARY OF THE INVENTION

The present invention provides a fire-resistant decompression panel assembly for use at a separation structure to quickly relieve pressure differences between two adjacent aircraft compartments. A decompression panel assembly formed in accordance with the present invention includes a support pan or support pan having a first surface, an opening, and a raised portion (e.g., a bull nose) surrounding the periphery of the opening and extending normally outward from the first surface. A pressure relief panel is used to cover the support pan opening and is therefore sized slightly larger than the opening. A retaining ring connects to the support pan such that the outer edge of the pressure relief panel is located and held between the raised portion and the retaining ring.

The retaining ring includes a number of segments or fingers available to flex independently of one another. In one embodiment of a panel assembly formed in accordance with aspects of this invention, the retaining ring is a single rectangular member having fingers formed from a number of spaced-apart slits extending into the retaining ring along the ring's inner periphery. Stress relief holes are provided at the ends of the slits to prevent crack growth initiation.

During normal (non-decompression) use, the fire resistant pressure relief panel is clamped between the retaining ring and the raised portion. The contacts between the ring, the pressure relief panel, and the raised portion are substantially airtight contacts, so that the panel assembly can prohibit the flow of oxygen and smoke between compartments and thereby resist the spread of fire and smoke. During a decompression event, one or more of the retaining ring fingers flexes slightly outward and in so doing reduces the holding force applied to the fire resistant pressure relief panel. This allows the pressure difference between compartments to easily and quickly detach the entire panel from the assembly.

In accordance with further aspects of this invention, the pressure relief panel is made of a fire resistant fiberglass and the retaining ring is fabricated from nickel chromium stainless steel. The panel assembly is preferably oriented in an upright plane with the support pan opening, pressure relief panel, and retaining ring rectangular shaped and oriented with their longitudinal axes extending laterally.

In accordance with other aspects of this invention, there are a number of optional features that may be included to enhance particular aspects of the panel's performance. To help centrally align the pressure relief panel during assembly, a number of index pins interconnect between the support pan and the retaining ring. In particular, the index pins extend from the support pan first surface and protrude through clearance holes provided in the retaining ring. The index pins are located such that the pressure relief panel edges just contact the pins. The pins therefore act as stop guides. The support pan may further include a recess surrounding the raised portion. An inner seal is sized and located within the recess, and is pocketed between the support pan and the retaining ring during use. The inner seal acts as an ablating heat sink.

The panel assembly may also include a grill for use in protecting the fire resistant pressure relief panel from objects within the compartment. In one embodiment, the support pan includes a second surface having a peripheral flange extending normally therefrom about the pan opening. A number of secondary pressure relief holes extend through both the grill sides and the flange to provide relief pressure equalization should the face of the grill be blocked. The grill is attached to the flange and generally covers the entire support pan opening. The grill is preferably formed by machining or casting a heat tolerant material, such as aluminum, titanium, cobalt, steel, etc.

In another embodiment, the panel assembly includes a deflection plate attached to the outlet side of the assembly that deflects the pressure relief panel and the airflow through the panel. This embodiment helps protect equipment or other items from damage caused by the impact of the panel or by the pressure from the air stream flowing through the panel opening.

In another embodiment, the panel assembly has an air inlet with curved edges that improves the airflow through the panel and, if made of a fire-resistant material, also improves the fire-resistant characteristics of the assembly.

In another embodiment, the panel assembly has a shaped grill on the inlet side of the assembly. This embodiment helps prevent blockage of the air passageway of the panel by luggage, cargo, or other objects.

These and other advantages of the invention will be apparent from the description that follows.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 5 is a detail cross-sectional view taken along lines 5—5 in FIG. 4; and

FIG. 6 is a detail cross-sectional view taken along lines 6—6 in FIG. 4.

DETAILED DESCRIPTION OF THE PREFERRED EMBODIMENT

The terms "outlet" and "inlet" as used herein in reference to opposite sides of the assembly mean, respectively, the side of the assembly that would first be subject to a rapid decrease in pressure in a rapid decompression event, and the opposite side of the assembly. During a rapid decompression event on the outlet side of the assembly, the pressure relief panel would release from the outlet side of the assembly and air would begin to flow rapidly through the assembly from the inlet side to the outlet side. If a rapid decompression event occurs on the inlet side of the assembly, the panel may release and air may flow from the outlet side to the inlet side, but the flow rate of the air will be considerably less than the flow rate occurring following a rapid decompression event on the outlet side of the assembly.

Figure 1:
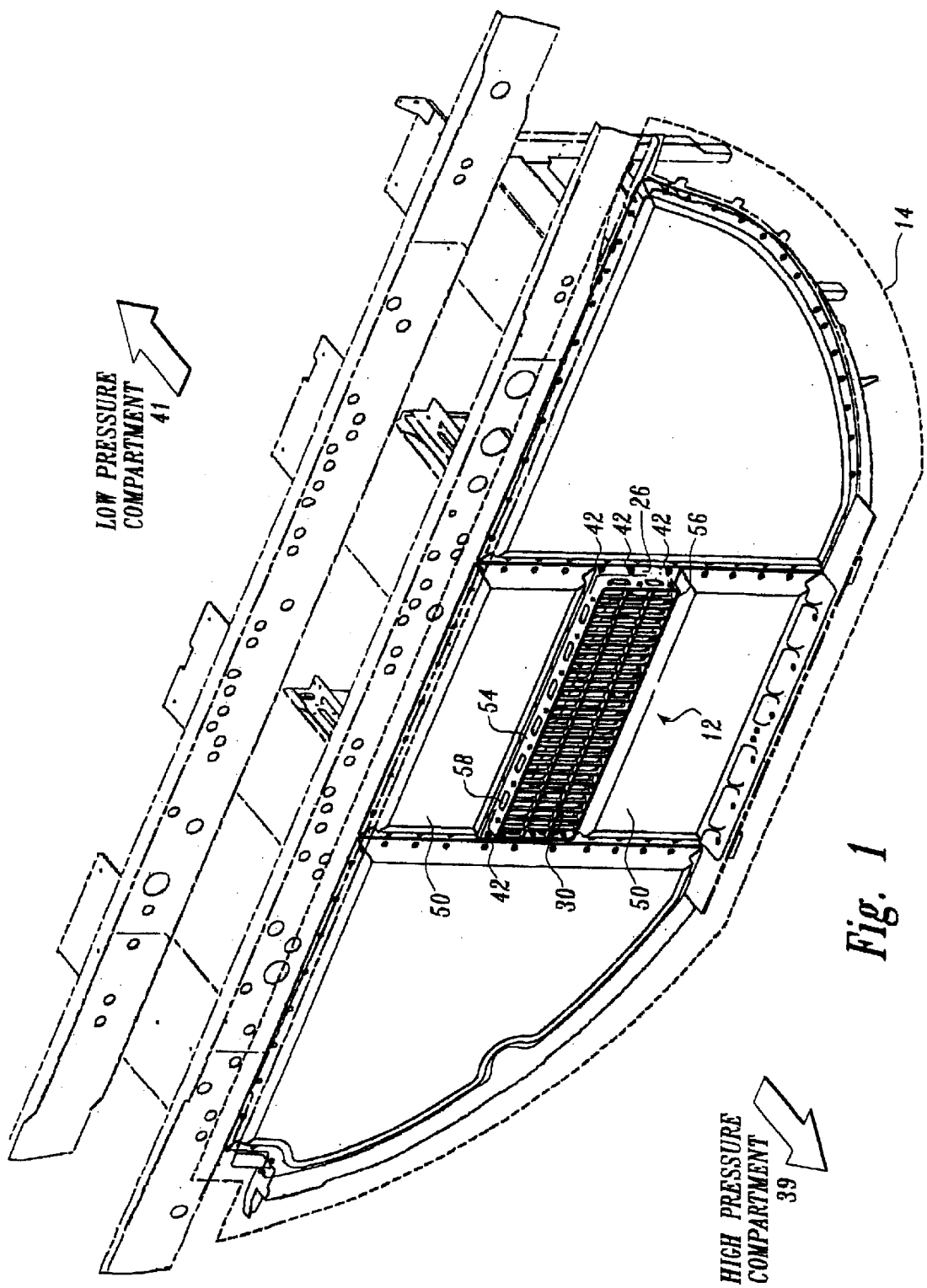
FIG. 1 is a perspective view of a fire-resistant pressure relief panel assembly formed in accordance with the present invention as installed in a lower cargo hold forward bulkhead.

FIG. 1 is a perspective view of one embodiment of a decompression panel assembly 12 formed in accordance with the present invention. The assembly is shown installed in a bulkhead (i.e., more generally, a separation structure 14) that divides a cargo bay and an electronics bay. The view of FIG. 1 is taken from the cargo bay, looking forward. This particular separation structure and inter-compartment location was selected for illustrative purposes only. The assembly may be secured through other separation structures in an aircraft or space vehicle at locations in which sudden decompression may be required between adjacent compartments.

Figure 2:
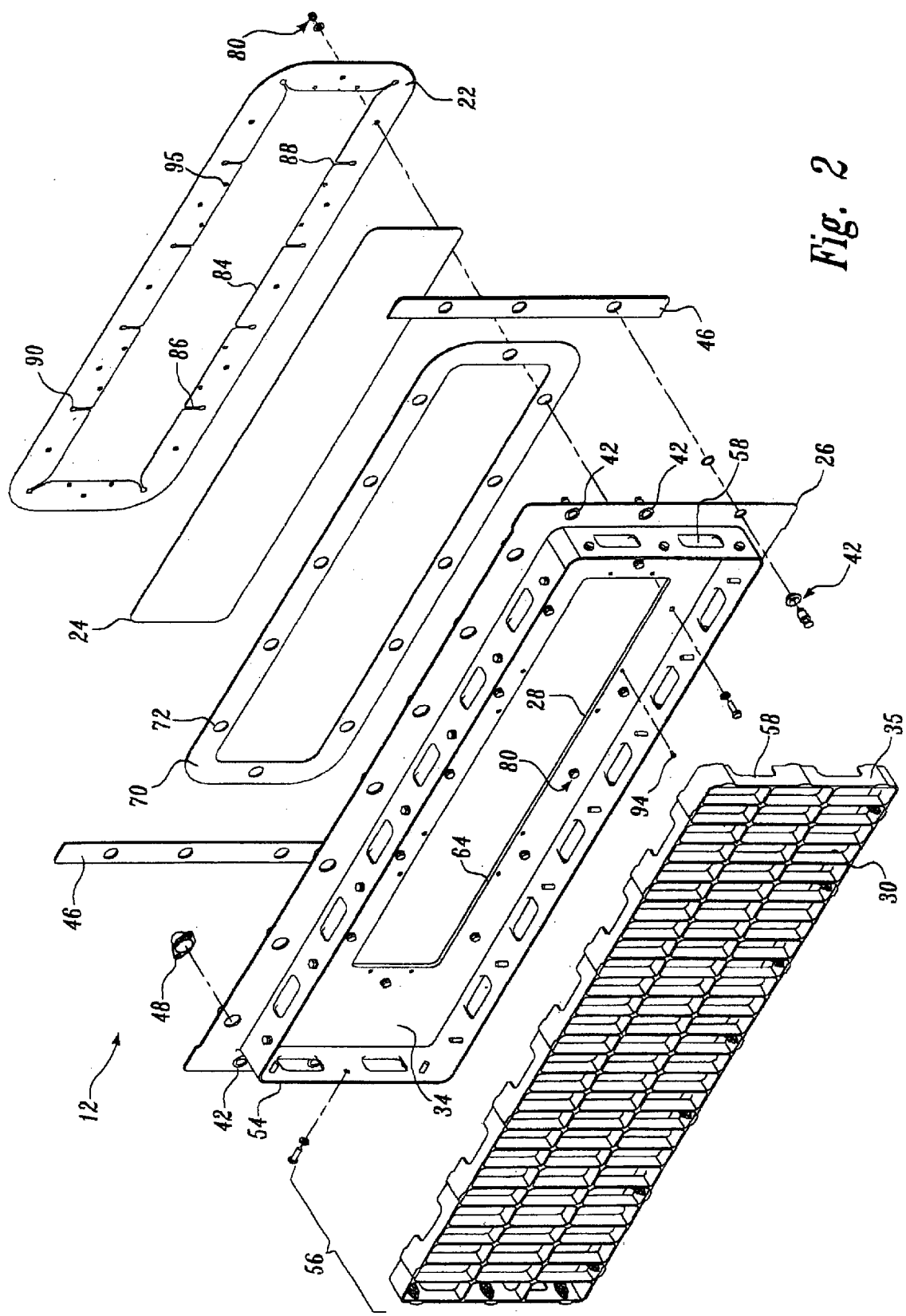
FIG. 2 is an exploded perspective view of the individual components of the assembly shown in FIG. 1, the components being positioned in an aligned though unassembled manner.

Referring to FIG. 2, the decompression panel assembly 12 generally includes a retaining ring 22, a fire resistant pressure relief panel 24, and a support pan 26 having an opening 28. During normal use, the pressure relief panel 24 covers the support pan opening 28 and is held in place by the retaining ring 22. The pressure relief panel effectively forms a substantially airtight seal around the opening 28 to resist the passage of flame or smoke from one adjacent compartment to the next. Should the pressure difference between compartments change rapidly, the retaining ring 22 flexes slightly to allow the pressure relief panel 24 to quickly and fully release from the assembly 12 and reveal the support pan opening 28, thereby allowing pressure to quickly equalize between adjacent compartments. The panel assembly 12 optionally includes a grill 30 to prohibit the pressure relief panel from being unintentionally dislodged (as might happen from luggage or personnel moving about in the cargo bay.)

Figure 3:
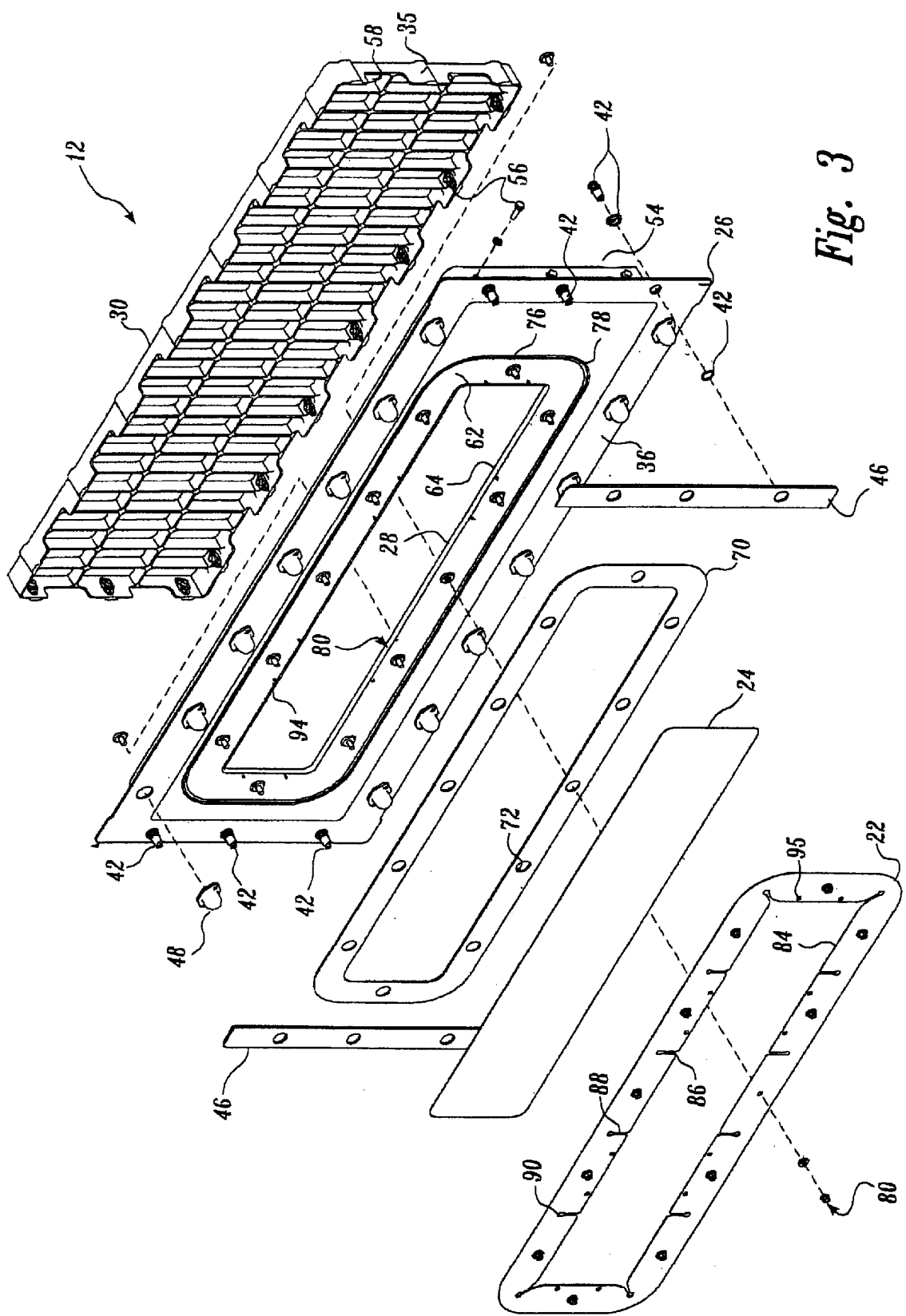
FIG. 3 is an exploded perspective view of the opposite side of the individual components of the assembly shown in FIG. 1.

In more detail, the support pan 26 is a rectangular shaped planar member having a first surface 34 and a second surface 36 (see FIG. 3.) As shown in FIG. 3, the opening 28 is generally positioned in the center of the pan. It is preferable to also use a rectangular or square opening, and, if possible, to orient the assembly 12 in the separation structure, so that the plane of the assembly is upright and the assembly's longitudinal axis is lateral as illustrated in FIG. 1. This orientation helps to further reduce the spread of fire between compartments by providing the least amount of vertical distance available for a flame to propagate. The pan 26 is preferably formed by machining or casting a heat tolerant material, e.g., aluminum, titanium, cobalt, steel, etc. If aluminum is selected, it should be increased in gauge thickness to counteract any metal degradation effects during a fire. An average pan thickness of about 0.15 inches to about 0.20 inches has been shown to work well.

The decompression panel assembly 12 is a one-way decompression relief panel, i.e., the pressure relief panel 24 is intended to fully release in one direction. The panel may be made of any suitable material, but is preferably comprised of a fire-resistant material, such as a fire-resistant fiberglass material. The panel or a series of panels are preferably sized large enough to accommodate the air flow rate necessary to equalize the pressures in the adjacent compartments at a rate fast enough to prevent collapse or other structural damage to the walls of the compartments, which is typically less than one tenth of a second. As an example, an adjoining wall of a cargo bay of a Boeing 737™ passenger airplane may utilize three panels, each of which have a cross-sectional area of about 250 square inches.

In FIGS. 1–4, the support pan first surface 34 (shown best in FIG. 2) is the side that faces the high-pressure compartment 39. The support pan second surface 36 (shown best in FIG. 3) is the side that faces the low-pressure compartment 41. Shown in FIG. 1, the support pan 26 is installed in the separation structure 14 using a number of fasteners 42. The fasteners 42 are inserted through the support pan and edge seals 46, through holes in the separation structure 14, and into the capped receptacles common to the separation structure on the low-pressure compartment side. The edge seals 46 keep the pressure relief assembly in substantially airtight contact with the separation structure. The seals 46 are preferably made of a heat resistant, nonflammable material, such as silicone.

It is important that the support pan fasteners 42 are connected to portions of the separation structure 14 that are themselves strong enough to maintain their shape and position during a rapid decompression event. Exemplary structures include support stanchions, contour rails, intercostals, floor beams, etc. Preferred fasteners 42 include cadmium steel quarter-turn stud assemblies having a pin, snap ring, and mating grommet. These types of fasteners are preferred because they allow quick and easy removal of the decompression panel assembly should the need arise, e.g., for maintenance or compartment access.

Referring to FIG. 3, the decompression panel assembly 12 for this application further includes capped receptacles 48 positioned near the support pan's 26 upper and lower side edges. The capped receptacles attach adjacent panel partitions 50 (see FIG. 1) above and below the decompression panel assembly.

Referring to FIG. 2, the support pan first surface 34 includes a peripheral flange 54 extending normally outward therefrom for use in connecting the grill 30 to the support pan 26. The peripheral flange 54 is made of a heat tolerant nonflammable material integrally formed with the other support pan portions. A preferred grill material is 7050-T7451 aluminum. The grill 30 has a depth that is approximately equal to the depth of the support pan peripheral flange 54. The grill is sized slightly smaller than the area bounded by the peripheral flange 54. The grill 30 therefore inserts into the flange 54 and is held by multiple grill fasteners 56 passed through the peripheral flange 54 and into side surfaces 35 of the grill 30. The fasteners 56 shown in FIG. 2 include titanium hex head screw bolts, cadmium plated countersink washers, and steel cadmium plated nut plates. The nut plates are riveted to the grill 30 and are part of its assembly. Both the peripheral flange 54 and the grill side surfaces 35 include secondary pressure relief holes 58 to permit air to pass into the support pan opening 28 in the event the outer grill surface is obstructed by foreign objects.

Referring to FIG. 3, the support pan second surface 36 includes a recess 62 that extends around the pan opening 28 and has a width that is greater than its depth. Referring to FIG. 5, the recess 62 is bounded at the support pan opening by a raised portion 64 (a bull nose is shown) that extends normally outward from the recess surface. FIG. 5 shows the inner edge of the support pan having a bull-nosed shape which, together with the retaining ring 22, provides a slight clamping force on the pressure relief panel 24. The clamping force should be sufficient to hold the panel in place, yet release quickly in the in the event of a rapid decompression event. Accordingly, the inner edges of the support pan and retaining ring may have any suitable shape to provide this effect. The inner edges of the support pan and retaining ring are also made of a non-flammable material that will not melt or burn during a fire event. Preferably, these edges are constructed of a suitable metal, such as steel or aluminum. Circular integral spacing mounts 66 are located at spaced intervals along the recess 62 and extend outward from the support pan recess surface a distance slightly less than the distance extended outward by the bull nose 64. A hole 68 is located through the support pan 26 at each integral spacing mount 66.

Still referring to FIG. 5, a nonflammable, noncompressed inner seal 70 made from silicone foam rubber is positioned within the recess 62 and serves as an ablating heat sink to further diminish the heat transferred from the support pan 26 to the retaining ring 22. The inner seal 70 has a thickness approximately equal to the recess depth. Seal holes 72 are provided along the inner seal 70 to accommodate the integral spacing mounts 66. During use, the seal 70 is preferably not compressed or pinched by the retaining ring and the support pan.

The support pan 26 further includes an outer ring ridge 76 that surrounds the recess 62. Between the recess 62 and the outer ring ridge 76 is a stepped index ring surface 78. The retaining ring 22 is a non-formed sheet metal part profiled slightly smaller in size than the area bounded by the outer ring ridge 76. During normal use, the retaining ring 22 is positioned adjacent to the support pan 26 such that the retaining ring's outer edge is indexed by the outer ring ridge 76, and the retaining ring's profiled inner edge is positioned near the bull nose 64. The retaining ring contacts the support pan 26 at the integral spacing mounts 66 and the stepped surface 78. The retaining ring 22 is held in this position via conventional bolt/nut combination type fasteners 80 inserted through the connection mount holes 68.

As shown best in FIGS. 5 and 6, the pressure relief panel 24 is positioned over the support pan opening 28 and is held in place about its periphery by a clamping force provided between the retaining ring 22 and the support pan bull nose 64. The clamping force is created when the retaining ring 22 closely contacts the integral spacing mounts 66. Since the mounts 66 extend outward slightly less distance than the bull nose 64 and the retaining ring 22 has some rigidity, the retaining ring 22 tends to push against the bull nose 64, thus effectively forming a clamp. Because most of the pressure relief panel 24 periphery is so held (with exceptions discussed below), the decompression panel assembly 12 acts as an oxygen and smoke barrier to aid in stopping fire hazards from spreading between compartments.

Equally important, is the ability of a decompression panel assembly 12 formed in accordance with the present invention to quickly release from the clamping force during a rapid decompression event. To ensure a satisfactory response, the retaining ring 22 is segmented (see FIG. 4) in a manner that permits the ring to flex or twist within the elastic range in response to pressure differences between adjacent compartments. In so flexing, portions of the retaining ring move laterally outward an amount sufficient to reduce the clamping force provided by the retaining ring 22 and the bull nose 64 at that location, thereby releasing a portion of the pressure relief panel 24. Once even a small portion of the pressure relief panel 24 is dislodged, the entire panel is easily suctioned out of the assembly and into the low-pressure compartment 41. After the pressure relief panel 24 has fully released, the support pan opening 28 is exposed and allows rapid equalization of pressure between adjacent compartments. Optional measures may be taken to reduce or add to the amount of clamping force provided between the retaining ring 22 and the bull nose 64, such as polishing the bull nose, altering the gauge thickness of the retaining ring 22, altering the height of the integral spacing mounts.

In the embodiments of FIGS. 1–6, the retaining ring 22 is a single non-frangible member having a number of segments or fingers 84 formed between slits 86 that are located at intervals along the inner edge of the retaining ring 22. The ring inner edge includes curved corners 88 at each slit 86 so that the slit edges do not catch on one another. Stress relief holes 90 are preferably located at the slit's inner end to prevent crack propagation. The various dimensions of the slits will vary depending on the response characteristics required in a particular application.

The retaining ring 22 is formed of a fire resistant material having a melting temperature that is much higher than the temperature of a fire anticipated for either adjacent compartment. Nickel chromium stainless steel 17-7PH has been shown to work well. The pressure relief panel 24 is formed of a heat and fire resistant material that is also flexible, e.g., BMS 8-223 fiberglass, etc. The preferred ring is non-frangible, that is it will not break during a decompression event, but will instead only flex. Both the pressure relief panel 24 and retaining ring 22 should be sized to provide the appropriate amounts of flexibility and rigidity. In one test assembly, a pressure relief panel of 0.021 inches having 0.2 inches of its outer periphery sandwiched between the support pan bull nose and the retaining ring worked well. In the embodiment shown, an overlap of 0.016 inch between the retaining ring and panel only requires a lateral movement of 0.032 inches, which caused the pressure relief panel 24 to release in less than one second after a rapid decompression event.

Figure 4:
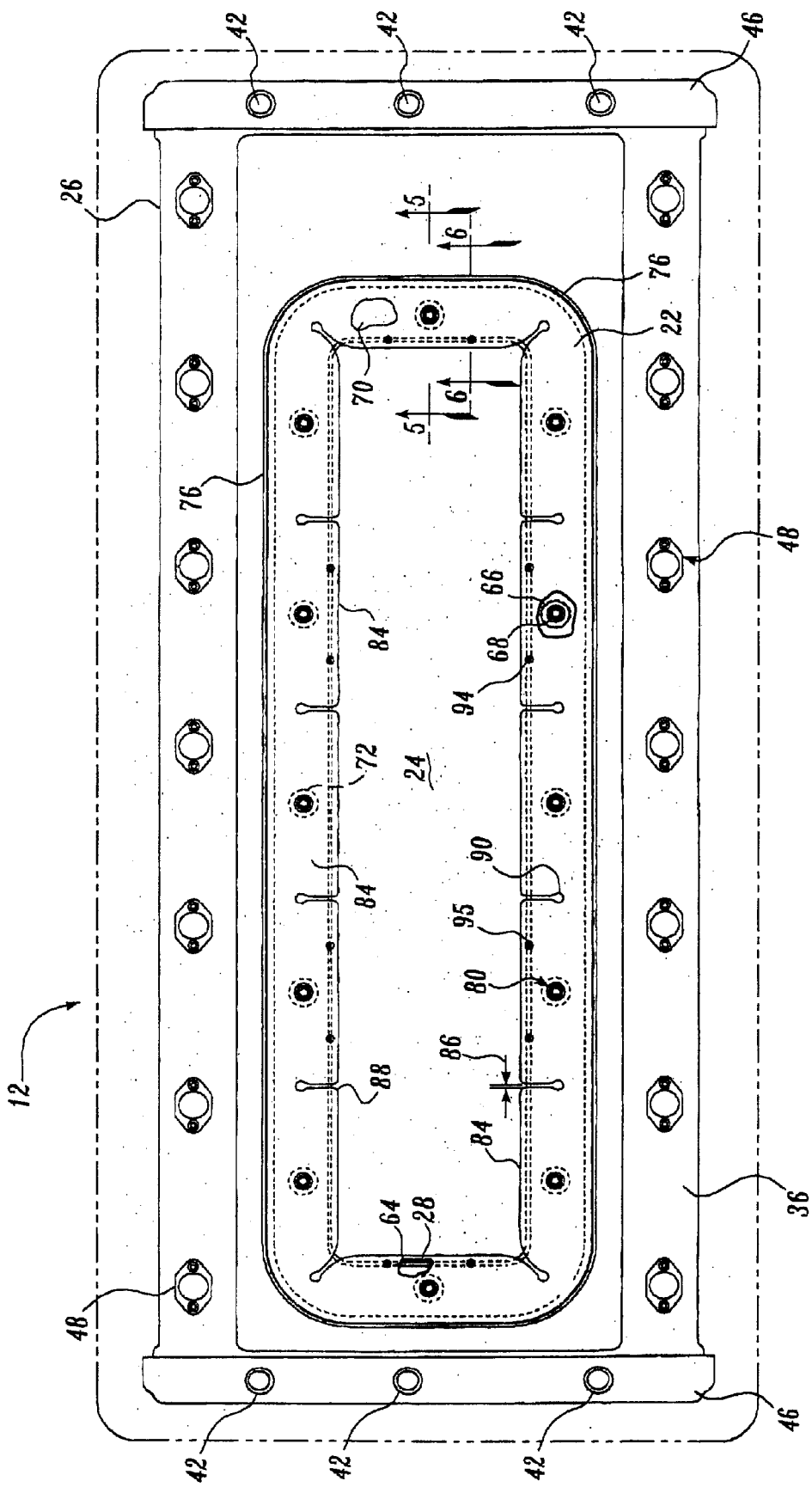
FIG. 4 is a side view of the assembly of FIG. 1.

To aid in centering the pressure relief panel 24 during assembly, a number of index pins 94 are provided between the retaining ring 22 and the support pan 26 at locations corresponding to the desired location of the relief panel's outer edge, as shown best in FIGS. 4 and 6. The number and location of index pins 94 must still allow a number of retaining ring fingers 84 to flex. Otherwise, the pressure relief panel 24 will not release properly. Depending on the precise component sizes, it may be desirable to form small, semicircular cutouts (not shown) along the inner edge of the inner seal and the outer edge of the pressure relief panel to negate any compression acting on the seal from the retaining ring 24. In any design, it is important that the index pins 94 do not pinch, catch, or bind the pressure relief panel 24 or the retaining ring 22. The index pins shown in FIGS. 1, 4 and 6 include titanium screws, cadmium plated steel countersink washers, self-locking cadmium steel plated nuts, and cadmium steel plated flat washers.

The decompression panel assembly 12 is formed by the following steps. The index pins 94 are connected to the support pan. The inner seal 70 is placed within the support pan recess 62. The fire resistant pressure panel 24 is placed over the support pan opening 28 to contact the bull nose 64. The panel peripheral edge is aligned using the index pins 94. The retaining ring 22 is positioned on top of the fire resistant pressure relief panel 24 and the inner seal, with the index pins 94 protruding through retaining ring clearance holes 95 (see FIGS. 4 and 6.) The retaining ring is positioned within the bounds of the outer ring ridge 76, contacting the stepped index ring surface 78. The fasteners 80 are installed at each mount hole 68 to connect the retaining ring 22 with the support pan 26. The grill 30 is inserted into the support pan peripheral flange 54 and is held there by the grill fasteners 56 which passed through the flange 54 and into the side surfaces 35 of the grill 30. The edge seals 46, quarter turn stud assemblies 42, and capped receptacles 48 are attached to the support pan. The decompression assembly is placed in the separation structure 14, and the adjacent panels 50 are installed.

Figure 7:
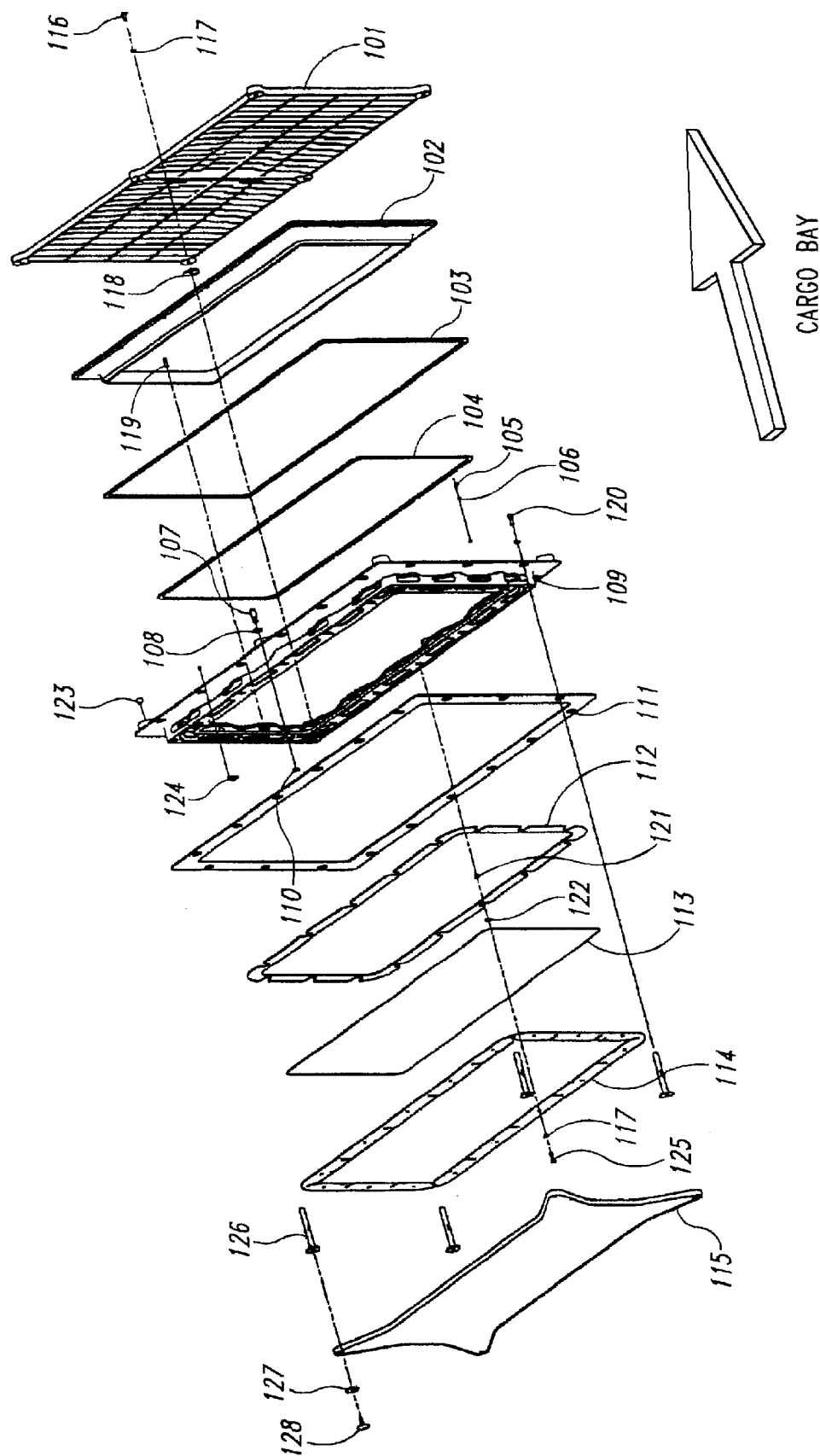
FIG. 7 is an exploded perspective view of the individual components of one embodiment of a pressure relief panel, the components being positioned in an aligned though unassembled manner.
Figure 8:
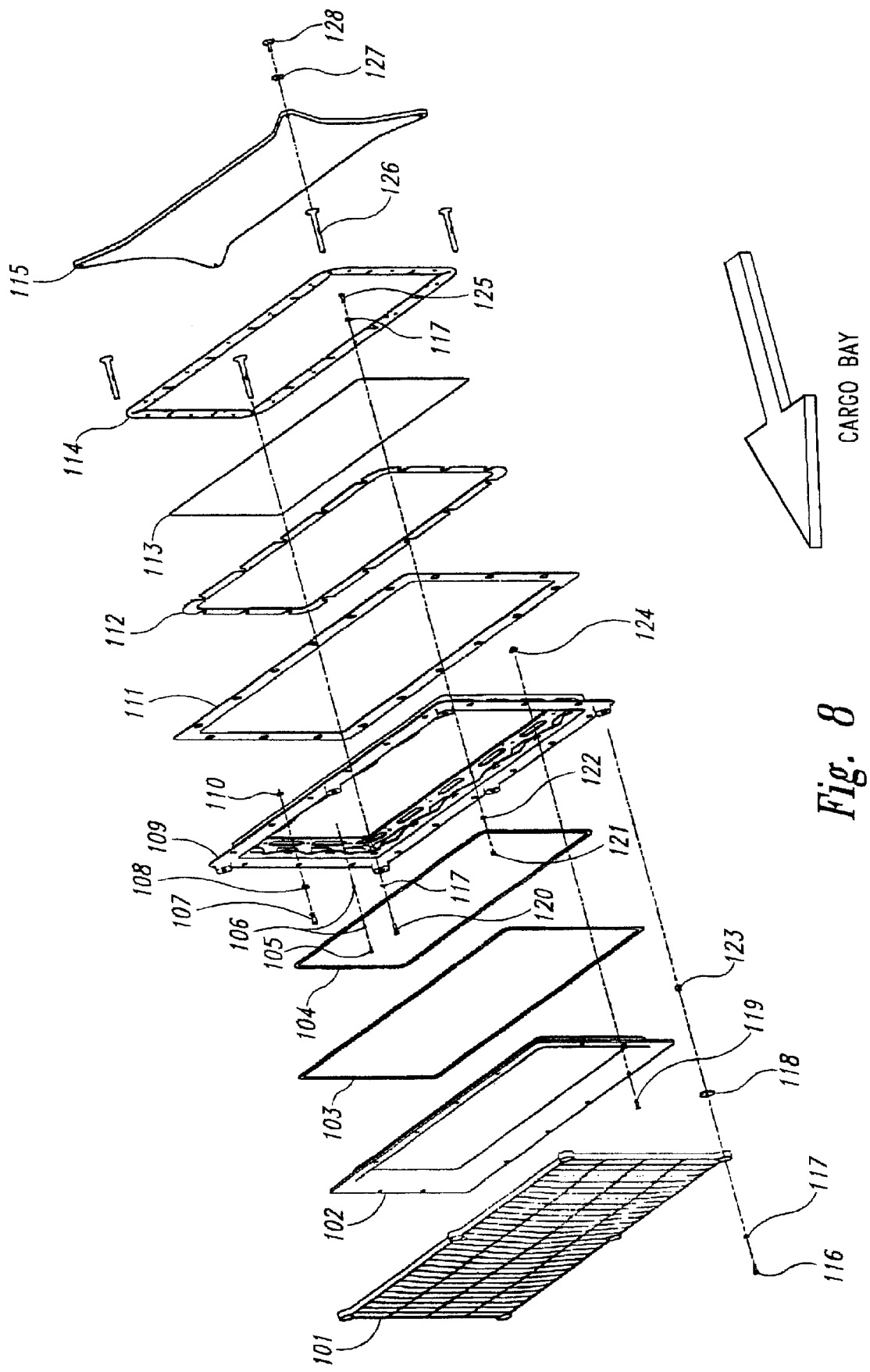
FIG. 8 is an exploded perspective view of the opposite side of the individual components of the assembly shown in FIG. 7.
Figure 9:
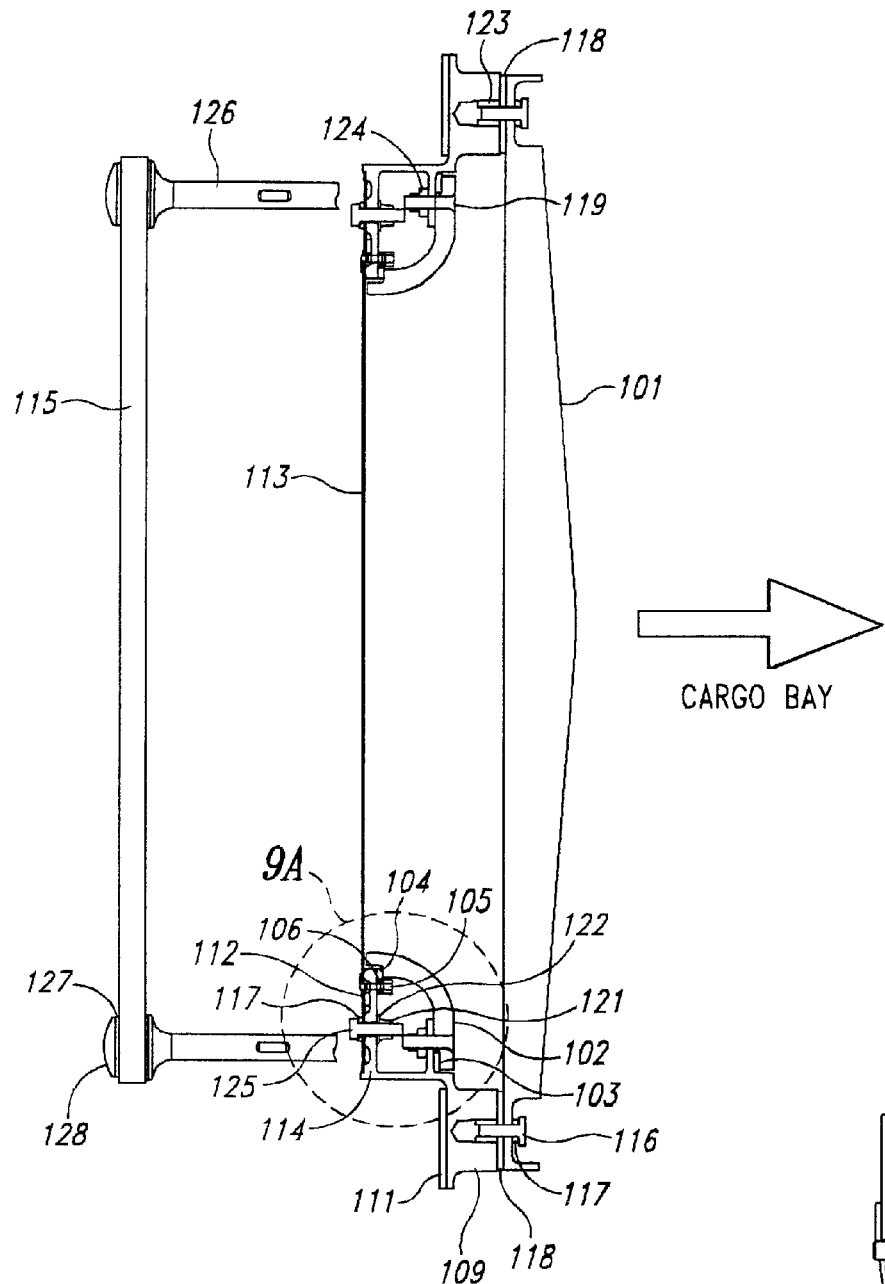
FIG. 9 is a side view of an assembled version of the embodiment shown in FIG. 7.

In the embodiment shown in FIGS. 7, 8, and 9 a grill 101 having an inlet face that is not flat protects the airflow paths from blockage and protects the pressure relief panel 113 from cargo within the cargo bay. The inlet face of the grill is preferably multifaceted and has at least two planar faces that are not parallel to each other, in order to prevent a planar-sided object next to grill from blocking the flow of air through the grill in the event the pressure relief panel is blown out of position. The face of the grill may have any suitable shape to prevent blockage of the panel assembly by cargo, but is preferably multifaceted or has a convex or concave shape. The grill is designed to allow efficient airflow through it in the event of a rapid decompression, while protecting the pressure relief panel 113 from loose cargo hitting the panel and dislodging it from its sandwiched position in between the pan 109 and retaining ring 114. The retaining ring is attached to the pan by screws 125, washers 117, 122, and nuts 121. The grill 101 is attached to six integrated streamlined circular bosses around the perimeter of the pan containing steel helicoils 123 fastened by titanium bolts 116, steel washers 117 and silicone rubber vibration isolation seals 118. The grill is attached to a support pan that includes at least a pan 109 to which the grill is attached. The face of the pan 109 has integrated streamlined curved bosses, which improves the side flow.

A bellmouth-shaped inlet 102 is part of the support pan and has a curved, aerodynamic shape to improve the flow efficiency of air through the assembly. The inlet may be made of any suitable material, but is preferably molded from a fiberglass-reinforced melamine sheet material, such as ASTM D709 IV Grade 5 sheet. The inlet may have any suitable shape, but is preferably a conic-generated shape such as circular or elliptical. It may also have a venturi flow nozzle shape, if desired. Preferably, the support pan has a thickness of at least 0.25 inches, more preferably at least 0.5 inches, and the length of the profile of the inlet is preferably at least twice the thickness of the support pan. In one embodiment, the downstream edge of the inlet has a flow-diffusing profile, to further enhance the speed of the airflow through the assembly, such as a chamfer or a conic-generated curve profile.

Figure 10:
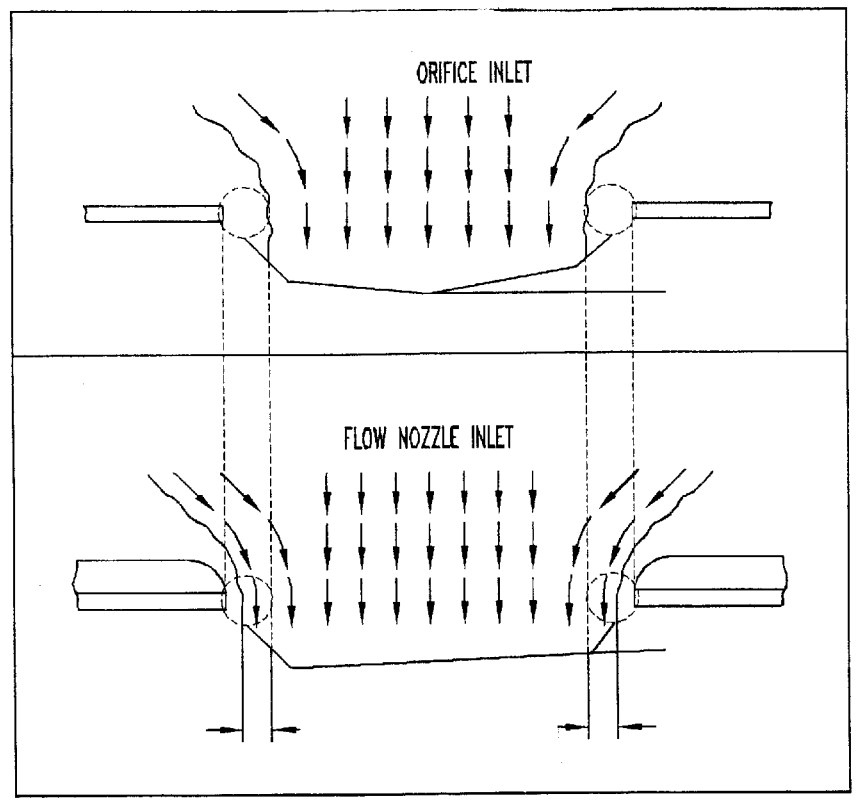
FIG. 10 illustrates the air flow efficiency resulting from the use of a support pan having a curved inner periphery.
Figure 11:
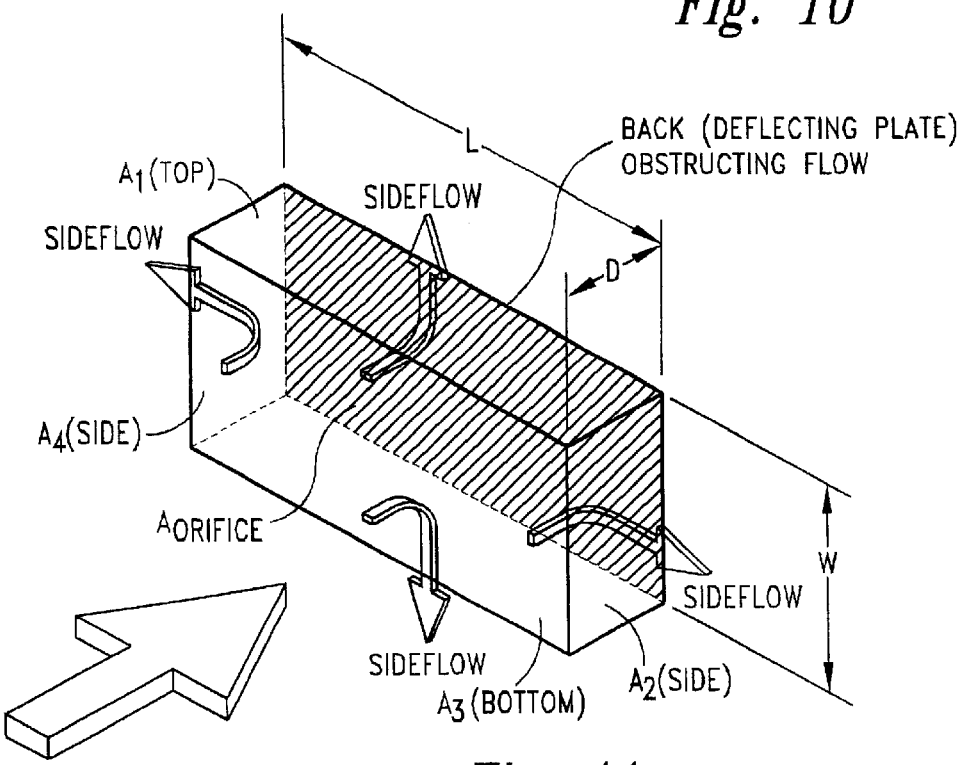
FIGS. 11 and 12 illustrate several configurations of support pan opening and deflector plates that divert the airflow.
Figure 12A:
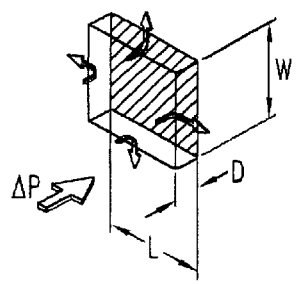
Figure 12B:
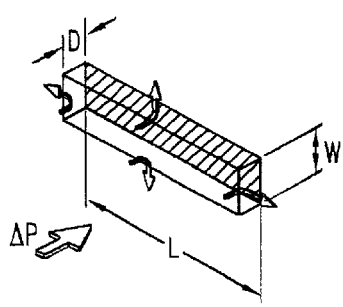
Figure 12C:
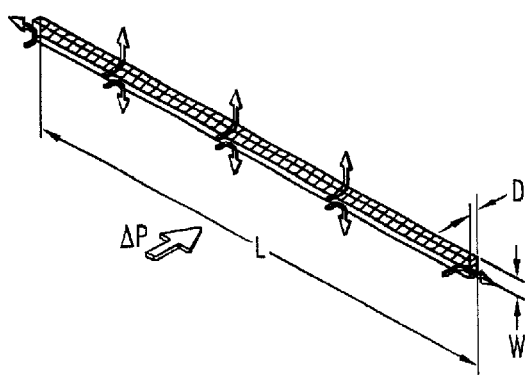
Figure 12D:
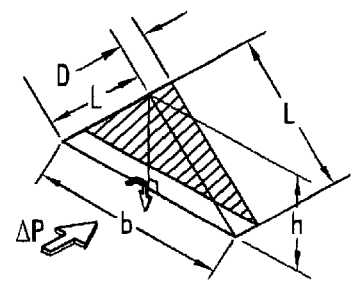
Figure 12E:
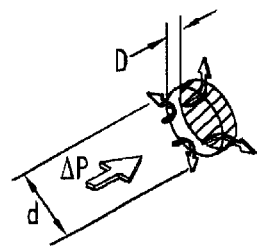
Figure 12F:
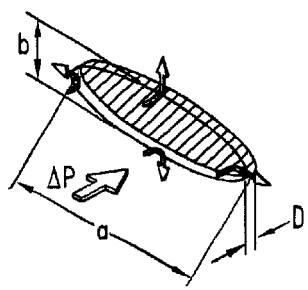
Figure 12G:
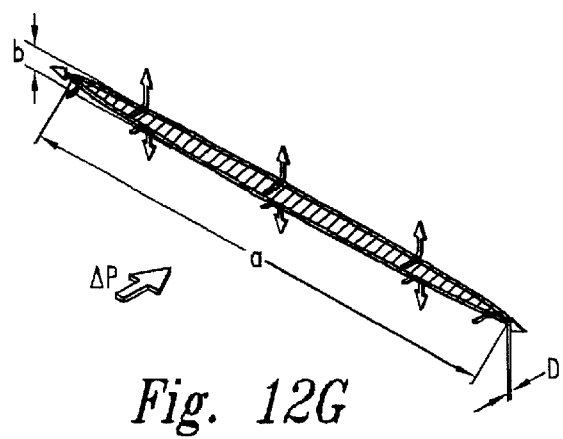

FIG. 10 illustrates the air flow path and volume past the opening in two types of support pans, one having a square edged inlet (top) and the other having a rounded inlet (bottom). This embodiment also preferably includes a deflector plate 115 that helps protect fragile objects located on the downstream side of the assembly, such as computer equipment, absorbing, shielding, turning, or reducing the effects of the rapid flow of air through the panel that may result from a rapid decompression event. The deflector plate may be comprised of any suitable material, but is preferably comprised of a carbon fiber-reinforced phenolic/aramid honeycomb sandwich composite. The panel is also preferably faced with Tedlar™ and peripherally trimmed with an extruded rigid urethane material that provides a smooth edge that may reduce chafing of wires or other objects adjacent to the panel. The panel may be fastened to the assembly by any suitable means. FIGS. 7 and 8 show the plate fastened to the assembly using four steel circular supports 126 with steel pan head bolts 128 and steel washers 127. Each of the four deflector plate supports 126 are fastened to the machined pan with one steel bolt 120 and one steel washer 117. The panel is preferably positioned close enough to the pressure relief panel to reliably deflect the panel in the event of a rapid decompression event, but is also far enough away from the panel to not significantly impede the flow of air through the opening during a rapid decompression event. FIG. 11 illustrates a method for calculating the preferred minimum distance, D, of the deflector plate from the support pan opening to minimize air flow blockage by the deflector plate. The area of the support pan opening, L×W, is set equal to the sum of the areas adjacent to the deflector plate, A1+A2+A3+A4, which equals 2(L×D)+2(W×D). Therefore, D, the preferred minimum distance of the plate from the orifice, is (L×W)/(2(L+W)). FIG. 12 illustrates that this side flow analysis to determine the preferred minimum distance of the deflector plate from the support plate may be carried out of on other shapes of support pan openings and deflector plates. The equations for calculating this distance for the various shapes depicted in FIG. 12 are, respectively, D=L/4 (FIG. 12A); D=L×W/(2(L+W)) (FIGS. 12B and 12C); D=bh/(2(2+b)) (FIG. 12D); D=d/4 (FIG. 12E); D=ab/(8×square root ((a$^2$+b$^2$)/2) (FIGS. 12F and 12G).

Figure 9A:
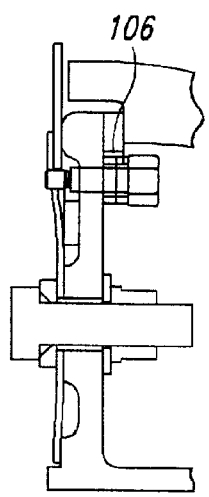

Referring now to FIGS. 9 and 9A, on the inlet side of the assembly, a pan 109 features an outer ring ridge that centers the retaining ring 114 within it. The inside edges of the pan preferably have a bull nosed portion which extends in the direction of the pressure relief panel, similar to that illustrated in item 64 of FIG. 5, so that the bull nose and the retaining ring 114 act as a clamp on the pressure relief panel, to enhance its usefulness as a partial or complete fire barrier. The curvature of the bull nosed portion limits the amount of static and dynamic frictional area that comes into contact with the pressure relief panel in the case of a rapid decompression event. Any suitable fastener may be used may be used to complete the clamp up joint. The fasteners illustrated in FIGS. 7, 8, and 9 are a titanium bolt 125, a steel washer 122, and a steel nut 121. A gradual recess area is preferably located in between the outer ridge and bull nose in the pan, to accommodate a rubber seal 112 that may act as a heat sink in the event of a fire. Preferably, the seal is comprised of flame-resistant, non-compressed silicone foam. An additional seal 111 helps seal the pressure relief assembly air tight to the stanchions and upper rails of the transverse electrical rack. This seal also inhibits airflow around the outside of the assembly.

On the inlet side of the pan 109, the grill may be fastened to the aft flange by any suitable means, such as titanium screw 116, steel countersunk washers 117, and steel helicoils 123 integral to streamlined circular bosses on the pan 109. The face of the pan 109 common to the inlet side has a thickness preferably in the range of from 0.10 inch to 0.200 inch to obtain a desired level of fire resistance.

The assembly also preferably contains an air inlet 102 on its inlet side having a profiled edge, that acts as a flow nozzle to increase the volume of airflow through the panel in the event of a rapid decompression event. The inner periphery of the pan has a profile so that the cross-sectional area of the inlet side is greater than that of the outlet side. The shape of the edge may be any suitable shape that will act to increase the flow of air though the inlet relative to an edge having a 90-degree angle. Examples of suitable upstream edge shapes are curved, rounded, elliptical, and venturi. On the downstream side, a chamfer or other flow-diffusing profile will also improve the rate of air flow through the opening. This inlet may be secured to the assembly by any suitable means, such as titanium-countersunk bolts 119 and floating nutplates 124 common to the pan 109. The space between the inlet and pan, and the pan and the panel is preferably sealed by peripherally shaped silicone rubber ring seals 103, 104, 111, and 112 that act as a heat sink in the event of a fire. The air inlet may be made of any suitable material, but is preferably comprised of a fire-resistant material such as melamine-impregnated fiberglass. The inlet side of the assembly preferably includes steel alloy index pins 105 and pin length protrusion adjustment washers 106. These pins 105 and washers 106 center the pressure relief panel 113 within the pan 109 and retaining ring 114 assembly. Around the periphery of the pan 109 are stud assemblies 107, 108 and 110 that allow the pressure relief assembly to be removed easily and quickly for access into the aircraft compartment outlet of the assembly. All of the fasteners common to the periphery are preferably made of steel or other fire-resistant material.

Figure 13:
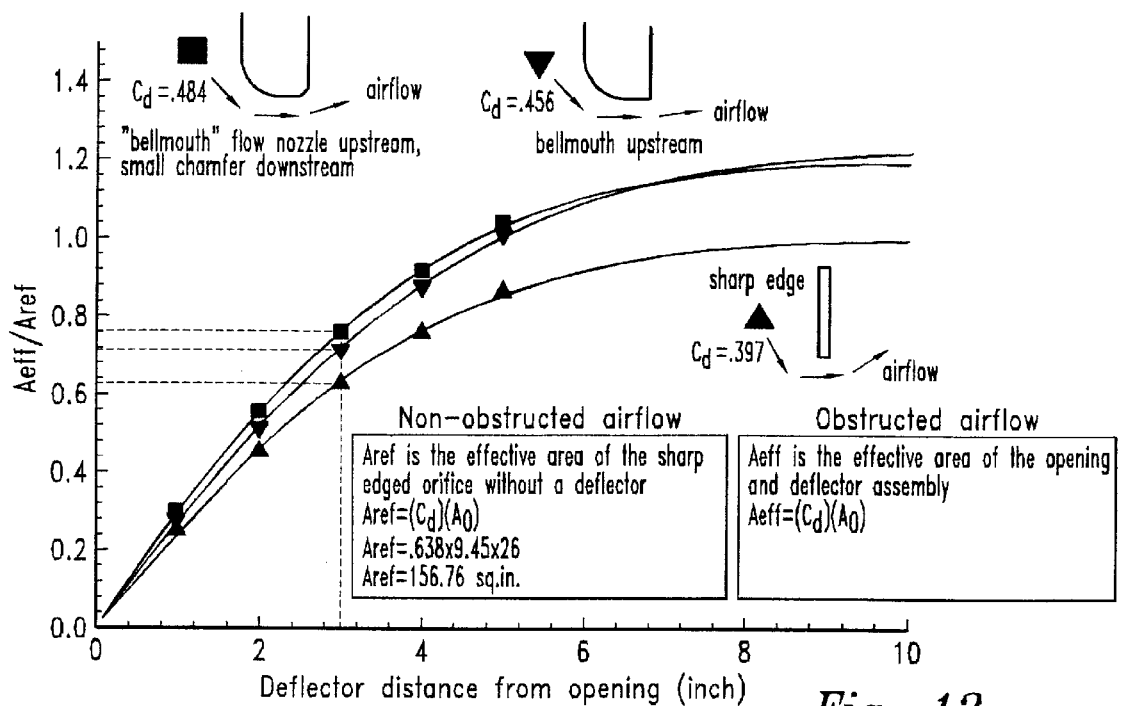
FIGS. 13 and 14 illustrate the effects of several different shapes for the inner periphery of the support pan.
Figure 14:
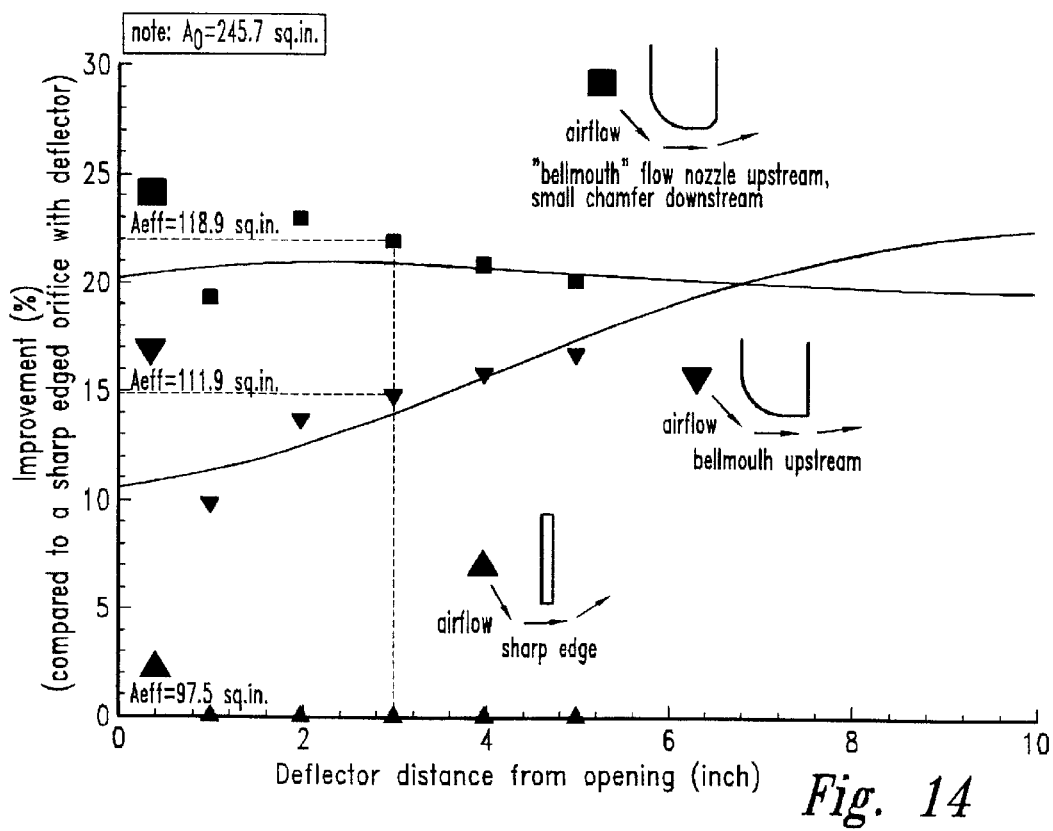

FIGS. 13 and 14 further illustrate the effects of a curved support pan opening, both with and without a chamfer on the downstream side.

As will be appreciated by those skilled in the art, a panel assembly formed in accordance with the present invention provides a fast, full-release pressure relief system that is fire resistant. While the preferred embodiment of the invention has been illustrated and described, it will be appreciated that various changes can be made therein without departing from the spirit and scope of the invention.

What is claimed is:

1. A decompression panel assembly having an inlet side and an outlet side, comprising:

(a) a ring-shaped support pan having an inner periphery, outer periphery, and opposing faces that define the inlet side and the outlet side of the assembly;

(b) a retaining ring attached to the outlet side of the pan, the ring having a plurality of flexible fingers on its inside periphery; and (c) a pressure relief panel positioned between the support pan and retaining ring over the center openings therein, and held in position by the edge of the panel being clamped between the pan and the fingers of the retaining ring, wherein the panel is releasable from this position by flexing of the fingers when a pressure of at least 20 psi is applied to the inlet side of the panel, and (d) a grill attached to the inlet side of the assembly that covers the entire support pan opening defined by its inner periphery, wherein the inlet side of the grill has at least two non-parallel planar faces.

2. A decompression panel assembly having an inlet side and an outlet side, comprising:

(a) a ring-shaped support pan having an inner periphery, outer periphery, and opposing faces that define the inlet side and the outlet side of the assembly;

(b) a retaining ring attached to the outlet side of the pan, the ring having a plurality of flexible fingers on its inside periphery; and (c) a pressure relief panel positioned between the support pan and retaining ring over the center openings therein, and held in position by the edge of the panel being clamped between the pan and the fingers of the retaining ring, wherein the panel is releasable from this position by flexing of the fingers when a pressure of at least 20 psi is applied to the inlet side of the panel, and (d) a grill attached to the inlet side of the assembly that covers the entire support pan opening defined by its inner periphery, wherein the inlet side of the grill has a concave or convex shape.

3. A decompression panel assembly having an inlet side and an outlet side, the panel assembly comprising:

(a) a ring-shaped support pan having an inner periphery, outer periphery, and opposing faces that define the inlet side and the outlet side of the assembly;

(b) a retaining ring attached to the outlet side of the pan, the ring having a plurality of flexible fingers on its inside periphery; and (c) a pressure relief panel positioned between the support pan and retaining ring over the center openings therein, and held in position by the edge of the panel being clamped between the pan and the fingers of the retaining ring, wherein the panel is releasable from this position by flexing of the fingers when a pressure of at least 20 psi is applied to the inlet side of the panel, and the inner periphery of the support pan has a thickness of at least 0.25 inch and its profile is shaped so that the cross sectional area of the inlet side is greater than that of the outlet side.

4. The decompression panel assembly of claim 3, wherein the profile of the inside periphery of the support pan has a conic-generated curved shape.

5. The decompression panel assembly of claim 4 wherein the curved shape is circular.

6. The decompression panel assembly of claim 4 wherein the curved shape is elliptical.

7. The decompression panel assembly of claim 3 wherein the profile of the inside periphery of the support pan has a venturi shape.

8. The decompression panel assembly of claim 4 wherein the support pan has a thickness of least 0.5 inch, and the length of the profile of the inside periphery has a length of least 1.5 inches.

9. The decompression panel assembly of claim 4 wherein the downstream edge of the inner periphery has a flow-diffusing profile selected from a chamfer or a conic-generated curve.

10. A decompression panel assembly having an inlet side and an outlet side, the panel assembly comprising:
  (a) a ring-shaped support pan having a portion on the outlet side that is raised in the outlet direction and extends around the inner periphery of the pan;
  (b) a retaining ring attached to the support pan on the outlet side having a plurality of flexible fingers on its inside periphery; and
  (c) a pressure relief panel positioned over the opening and between the support pan and retaining ring, the edge of which is held in position by being clamped between the raised portion of the pan and the fingers of the retaining ring,
    wherein the panel is releasable from this position by flexing of the fingers when a differential pressure of at least 20 psi is applied to the inlet side of the panel; and
  (d) a deflector plate attached to the outlet side of the panel assembly.

\* \* \* \* \*